(12) United States Patent
Lindberg et al.

(10) Patent No.: US 11,124,250 B1
(45) Date of Patent: Sep. 21, 2021

(54) ACTIVE AERODYNAMIC APPLICATION TORQUE DRIVE LINKS

(71) Applicant: Magna Exteriors Inc., Concord (CA)

(72) Inventors: Braendon R. Lindberg, Metamora, MI (US); Ross J. Parpart, Troy, MI (US); Martin R. Matthews, Troy, MI (US); Daniel Vander Sluis, Rochester Hills, MI (US)

(73) Assignee: MAGNA EXTERIORS, INC., Ontario (CA)

( * ) Notice: Subject to any disclaimer, the term of this patent is extended or adjusted under 35 U.S.C. 154(b) by 0 days.

(21) Appl. No.: 17/252,632

(22) PCT Filed: Jun. 21, 2019

(86) PCT No.: PCT/US2019/038570
§ 371 (c)(1),
(2) Date: Dec. 15, 2020

(87) PCT Pub. No.: WO2019/246578
PCT Pub. Date: Dec. 26, 2019

Related U.S. Application Data (60) Provisional application No. 62/688,152, filed on Jun. 21, 2018.

(51) Int. Cl.
*B62D 37/02* (2006.01)
*B62D 35/00* (2006.01)

(52) U.S. Cl.
CPC ............ *B62D 37/02* (2013.01); *B62D 35/00* (2013.01)

(58) Field of Classification Search
CPC ......... B62D 35/00; B62D 37/02; F16D 1/027; F16B 17/004
See application file for complete search history.

(56) References Cited

U.S. PATENT DOCUMENTS 9,950,754 B2 * 4/2018 Povinelli .............. B62D 35/005
2017/0101136 A1 * 4/2017 Zielinski .............. B62D 35/005

FOREIGN PATENT DOCUMENTS

| DE | 19945755 A1 | 3/2001 |
| EP | 0195150 A1 | 9/1986 |
| WO | 2015191711 A2 | 12/2015 |

OTHER PUBLICATIONS

Notification of Transmittal of the International Search Report and the Written Opinion of the International Searching Authority for International Application No. PCT/US2019/038570, dated Sep. 20, 2019.

* cited by examiner

*Primary Examiner* — Lori L Lyjak
(74) *Attorney, Agent, or Firm* — Warn Partners, P.C.

(57) ABSTRACT

An active aerodynamic application torque link system including a four bar linkage having a fixed link, driven link, follower link and coupler. The fixed link has a follower link aperture and a driven link aperture. The follower link has a first end rotatably connected to the follower link aperture of the fixed link and a second end of the follower link is connected to the coupler. The driven link is rotatably connected at a first end to the coupler and coupled at a second end to a torque transfer tube that has a cross sectional shape of a four sided polygon with four radial facets. The four sided torque transfer tube is rotatably connected to the driven link aperture of the fixed link. The four bar linkage is used in a number of different applications by connecting the coupler with different components.

26 Claims, 8 Drawing Sheets

ACTIVE AERODYNAMIC APPLICATION TORQUE DRIVE LINKS

FIELD OF THE INVENTION

The present invention relates to a scalable active aerodynamic application for a torque driven link system implementing the use of a polygon four sided torque transfer tube.

BACKGROUND OF THE INVENTION

In the automotive field and there has been an increased demand for more fuel efficient vehicles. One way that automotive manufacturers have sought to increase fuel efficiency is to improve the aerodynamics of the vehicle to reduce wind drag. This often involves employing spoilers, air dams, active grille shutter systems and tire spats. Traditionally these features are static, however they can sometimes take away from the aesthetics of the vehicle. Additionally other structures such as air dams and tire spats provide no benefits at low speeds and can actually create problems as the car travels over obstacles, usually encountered when driving at lower speeds. Therefore it is desirable to make the air dam and tire spats active so that they deploy when the vehicle is traveling at higher speeds, but will move to an undeployed or stowed position when the vehicle is moving at slower speeds. This allows for more ground clearance to travel over obstacles such as speed bumps, curbs or other objects.

Existing active aerodynamic applications typically implement a type of actuator and driven link system. Some of the problems encountered with existing aerodynamic applications is that the drive line for the systems implement a complex number of components, which can create tolerance issues between components creating a noticeable lag between the actuator and the end driven components such as an air dam. This tolerance issue can contribute to wear and eventual failure of the system components. Existing systems also lack modularity to accommodate different system designs. Additionally existing systems often employ the use of several hubs connected to a rotating torque tube in order to move between the deployed and undeployed positions. Often times the hubs must be quite large thereby creating problems with packaging efficiency.

It is an object of the present invention to design a system that reduces the number of components and complexity of the driven link system. It is further an object of the present invention to design a system that reduces or eliminates sensitivity to tolerance, such that there is no lag in performance when the driven link is actuated. It is also an object of the present invention to reduce the packaging size of the driven link system and provide the smallest possible driven link, while delivering the highest amount of torque. Lastly it is an object of the invention to design a driven link system that is easily scalable in size, performance and configurations across several different design programs.

SUMMARY OF THE INVENTION

An active aerodynamic application torque link system including a four bar linkage having a fixed link, driven link, follower link and coupler. The fixed link has a follower link aperture and a driven link aperture. The follower link has a first end rotatably connected to the follower link aperture of the fixed link and a second end of the follower link is connected to the coupler. The driven link is rotatably connected at a first end to the coupler and coupled at a second end to a torque transfer tube that has a cross sectional shape of a four sided polygon with four radial facets. The four sided torque transfer tube is rotatably connected to the driven link aperture of the fixed link. The four bar linkage is used in a number of different applications by connecting the coupler with different components. For example, the coupler can be connected to a running board, spoiler, air dam or other active components on a vehicle.

The driven link further includes a drive aperture formed through the second end of the driven link that is used to connect the torque transfer tube to the driven link using a torsional non-sliding interference fit. The torsional non-sliding interference fit is provided by the drive aperture having a plurality of drive zones each including a plurality of ramp surfaces having a length and a plurality of flat surfaces having a length that abut against one of the four sides of the torque transfer tube. Each of the four sides of the torque transfer tube have radial facets that are separated by rounded corners. This design combined with the shape of the drive bore of the drive link and the collar of the actuator allows assembly by different types of interference fits, while also reducing spacing tolerances and eliminating lag between components.

The movement of the active aerodynamic application torque link system is provided by an actuator. The actuator is connected to the torque transfer tube and rotates torque transfer tube thereby transferring torque to the four bar linkage through the driven link.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and is in no way intended to limit the invention, its application, or uses.

The following terms and their definitions are now provided. "Torsional interference fit" as used herein is defined as a fit between two parts in which the external dimension of first part slightly exceeds the internal dimension of the second part I in a way that eliminates or reduces torsional free play between the first part and second part. "Torsional non-sliding interference fit" as used herein is defined as an interference fit between two parts in which a first part is forced under pressure into a slightly smaller hole or aperture in the second part in a way that both eliminates torsional free play between the first part and the second part and also affixes the location of the first part onto the second part. "Polygon four sided torque rod" is a torque rod having four main radial facets with four corner radii, where each one of the four corner radii are located between two main radial facets. "Neutral fit is a fit" between two parts that is not forced under pressure into a slight smaller hole in the second part, but rather the fit is accomplished without the use of significant force pressure and the first part and second part are able to slide with respect to one another.

Figure 1:
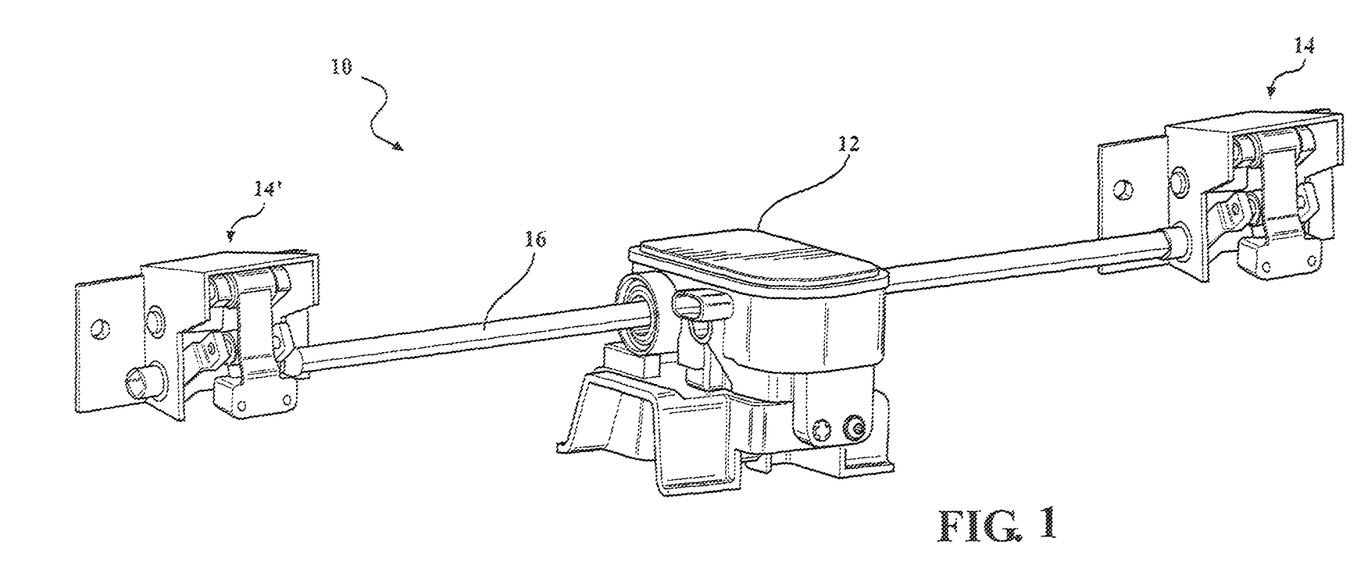
FIG. 1 depicts a side perspective view active aerodynamic torque link system with four bar linkage according to one embodiment of the present invention.

Referring now to the figures an active aerodynamic torque link system 10 is shown. As shown in FIG. 1 the active aerodynamic torque link system has scalability in that an actuator 12 and individual four bar links 14, 14' are positionable at various locations along a torque transfer tube 16. FIG. 1 demonstrates the scalability and variations available using the active aerodynamic torque link system 10. As shown there is a single actuator 12 and two four bar links 14, 14'; however it is within the scope of this invention to provide additional actuators and four bar linkages depending on the particular application. The unique components of the four bar link, in particular the torque transfer tube 16 along with the hub design allows for the components shown in FIG. 1 to be quickly positioned at desired locations thereby providing versatility and compatibility with a number of different global platforms.

Figure 2:
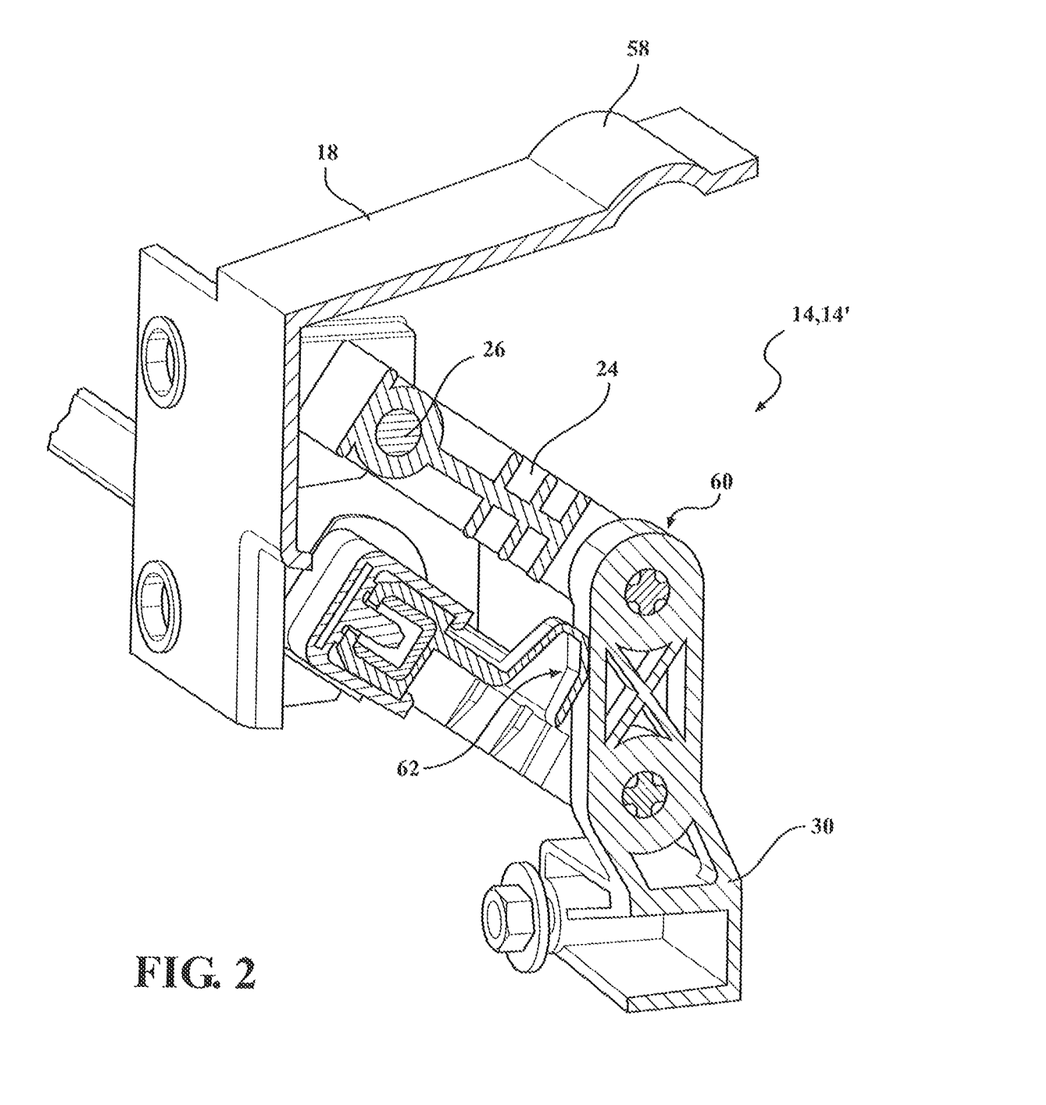
FIG. 2 is a top perspective view of the four bar linkage used in the active aerodynamic torque link system.
Figure 3:
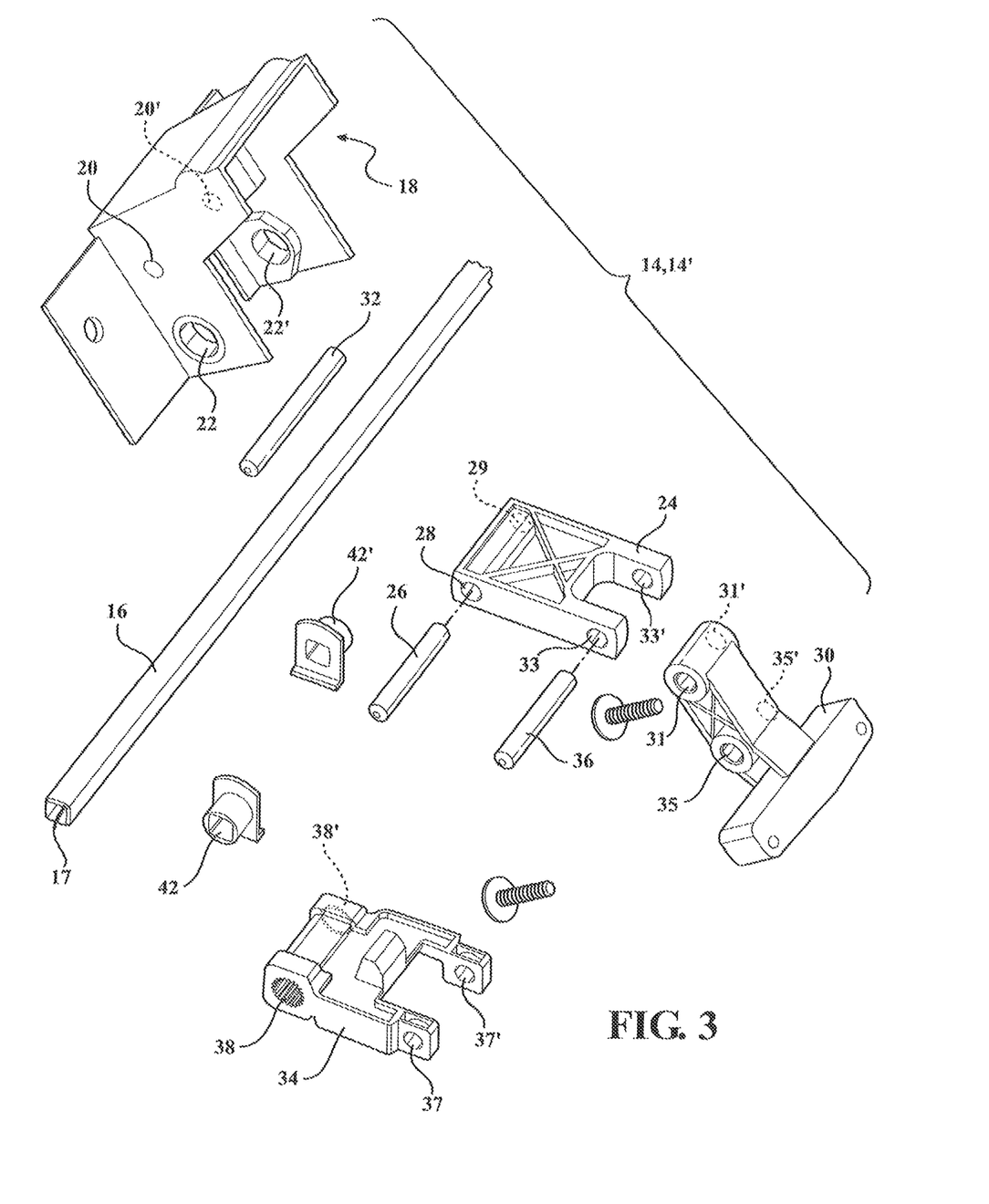
FIG. 3 is an exploded side perspective view of the four bar linkage used in the active aerodynamic torque link system.

Referring now to FIGS. 2 and 3 the details of the four bar links 14, 14' are now described. The four bar links 14, 14' include a fixed link 18 having follower link apertures 20, 20' and a driven link apertures 22, 22'. A follower link 24 is rotatably connected at one end to the fixed link 18 using a pin 26 disposed through an aperture 28 in the follower link 24 and through an aperture 29 on the opposite side. The pin 26 also extends through the follower link apertures 20, 20' on the fixed link 18. A second end of the follower link 24 is rotatably connected to apertures 31, 31' of a coupler 30 with a pin 32 disposed through apertures 33, 33' at a second end of the follower link 24 and a first end of the coupler 30. The coupler 30 is connected to an aerodynamic structure such as tire spats or an air dam (not shown). Second apertures 35, 35' in the coupler 30 is rotatably connected with a driven link 34 using a pin 36 that extends through the second apertures 35, 35' of the coupler 30 and through an apertures 37, 37' in a first end of a driven link 34. A second end of the driven link 34 includes first drive aperture 38 and second drive aperture 38' that connected to a drive bore 82 (shown best in FIG. 7) and are shaped for creating a torsional non-sliding interference fit onto a torque transfer tube 16. The torque transfer tube 16 also has a chamfer 17 surface having an angle that allows the end of the torque transfer tube 16 to slide through the drive bore 82 of the driven link 34 and through a collar 44 (described below) of the actuator 12. The chamfer 17 has an angled surface that removes a flat edge on the torque transfer tube 16, which could damage the components of the active aerodynamic torque link system 10 during assembly.

The torque transfer tube 16 also extends through the driven link apertures 22, 22' of the fixed link 18 thereby rotatably connecting the driven link 34 to the fixed link 18. The torque transfer tube 16 also extends through bushings 42, 42' that slide into the driven link apertures 22, 22' of the fixed link 18. The bushings 42, 42' have a neutral fit with the torque transfer tube 16 and are configured to rotate with the torque transfer tube within the driven link aperture 22. The bushings 42, 42' have a rounded aperture that mitigates wear between the torque transfer tube 16 and the driven link apertures 22, 22'. The bushings 42, 42' are optional components and are typically made from polyoxymethylene polymer, which provides desirable friction and durability properties as well as low noise when the torque transfer tube 16 rotates the bushings 42, 42'.

Figure 4:
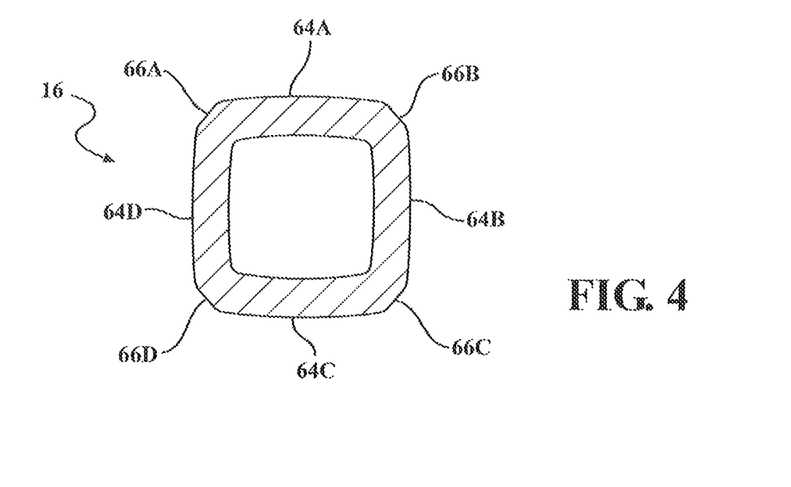
FIG. 4 is a cross-sectional plan end view of a torque transfer tube in accordance with the present invention.

Referring now to FIG. 4 the details of the torque transfer tube 16 are shown and described. The torque transfer tube 16 has a unique cross-sectional shape that is a four sided polygon torque transfer tube having four radial facets 64A, 64B, 64C, 64D each having a rounded external surface as shown in the cross-sectional view shown in FIG. 4. Between each of the radial facets are rounded corners 66A, 66B, 66C, 66D. This unique cross-sectional shape of the torque transfer tube 16 combined with the shape of the drive aperture 38 on the driven link 34 allows the active aerodynamic application torque link system 10 to be assembled by interference fit, thereby eliminating the need for set screws. Additionally the cross-sectional shape of the torque transfer tube 16 and the inner surfaces of the drive aperture 38 reduced the spacing tolerances and eliminates lag between the driven link 34 and the torque transfer tube 16, when the torque transfer tube 16 rotates.

Figure 5:
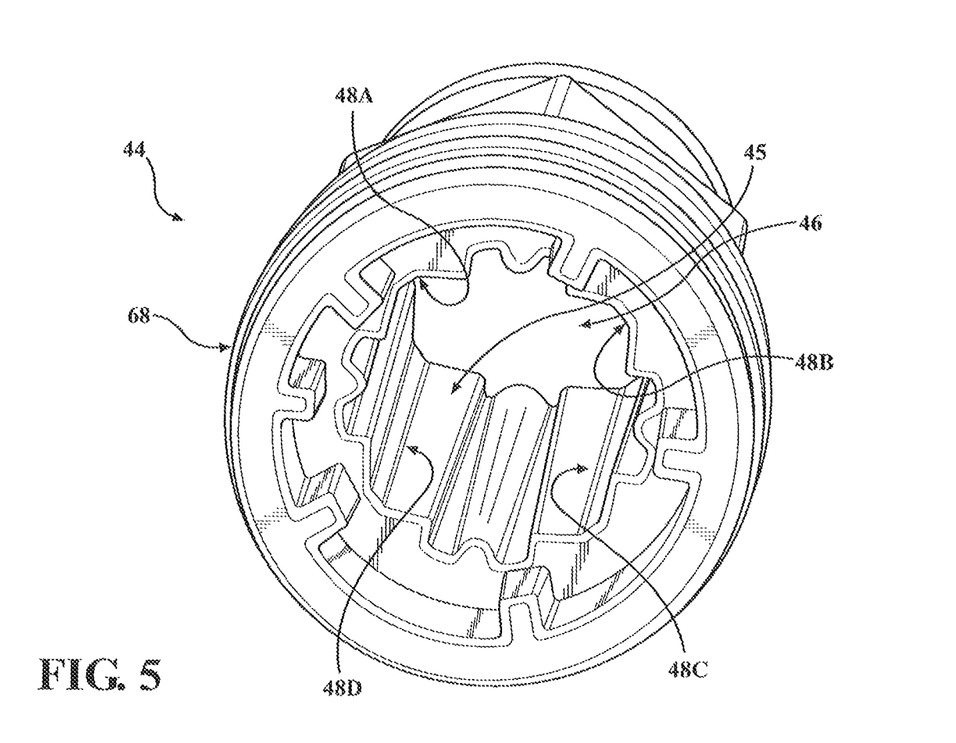
FIG. 5 is a cross-sectional plan end view of a collar portion of an actuator in accordance with the present invention.
Figure 10:
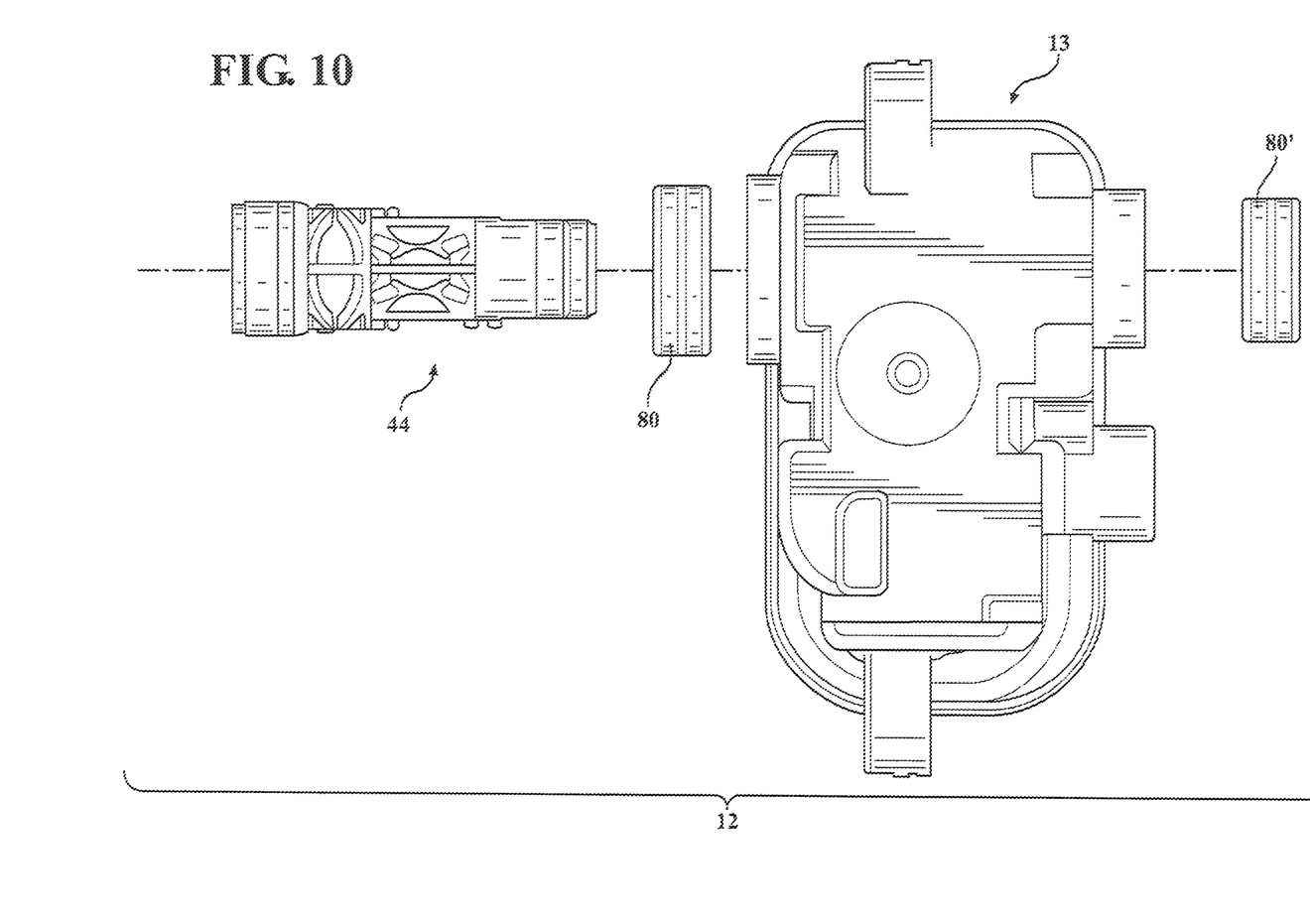
FIG. 10 is an exploded top plan view of the actuator.

The torque transfer tube 16 is connected to the actuator 12 using the collar 44 shown in FIG. 5. Referring to FIG. 10 the collar 44 connects to the actuator housing 13 and is held in place by a torsional interference fit between the collar 44 and the torque transfer tube 16 provided by features on the surface of the collar. Seals 80, 80' are placed at the ends of the collar 44 and function to prevent water and debris from entering the housing 13 between the housing and ends of the collar 44. The seals 80, 80' also help retain the collar 44 within the housing 13. The collar 44 extends through the housing 13 of the actuator 12 and allows a push rod to extend through the housing 13 so that the four bar links 14, 14' shown in FIG. 1 can be moved by a single push rod. The collar 44 is connected to gearing in the actuator housing 13 that selectively rotates the collar 44 and push rod bi-directionally.

FIG. 5 shows a perspective end view of the collar 44 having an internal surface 45 of a bore 48 extending through the collar 44. On the internal surface 45 of the bore 46 are twisted or rifled ridges 48A, 48B, 48C, 48D that cause the collar 44 to twist onto the torque transfer tube 16 during a torsional interference fit connection. The rifled ridges 48A, 48B, 48C, 48D illustrate one particular way of connecting the torque transfer tube 16 with several components including the driven link 34 as well as the collar 44. The rifled ridges 48A, 48B, 48C, 48D have interference surfaces and relief surfaces that extend through the length of the bore 48 formed in the collar 44. The interference surfaces provide a torsional interference fit between the torque transfer tube and the interference surfaces, while the relief surfaces have a neutral fit between the torque transfer tube and the relief surfaces.

Figures 9A, 9B:
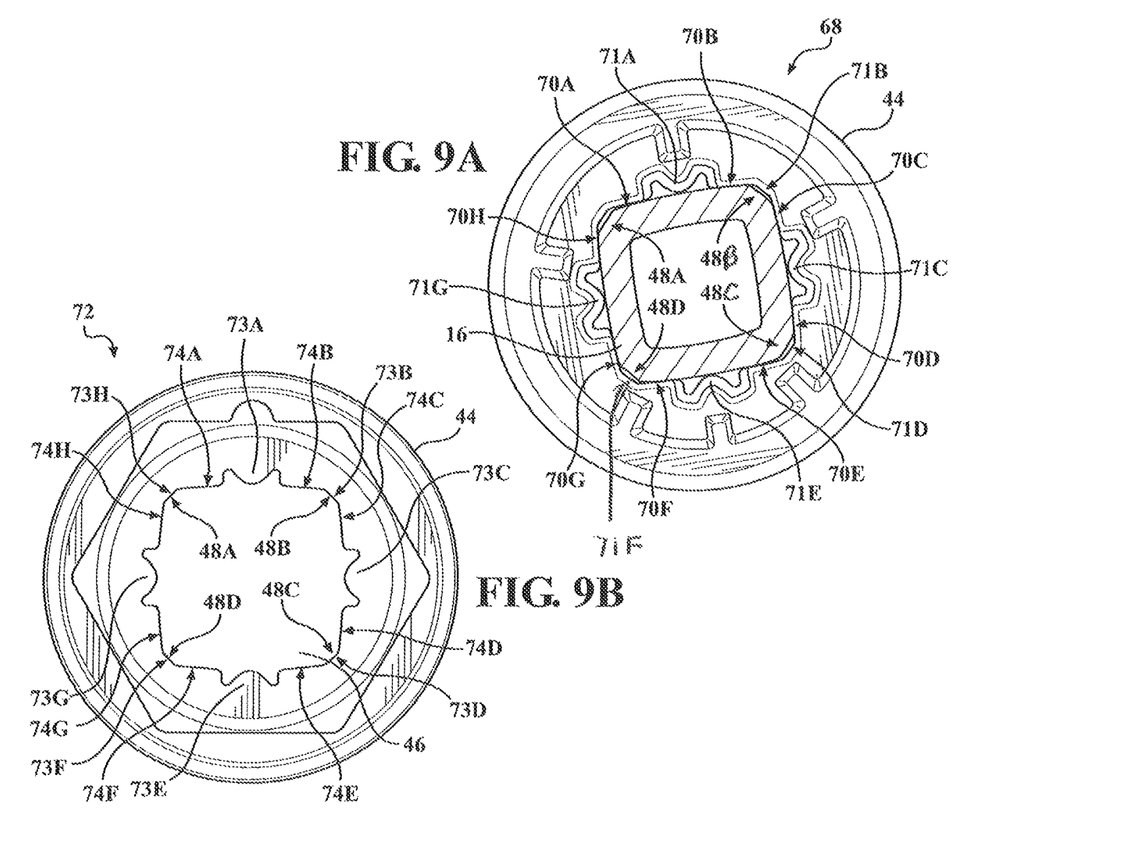
FIG. 9A is a plan end view of a first end of the collar according to the present invention.
FIG. 9B is a plan end view of a second end of the collar according to the present invention.

Referring now to FIGS. 9A and 9B details of the rifled ridges 48A, 48B, 48C, 48D are seen. FIG. 9A shows an end view of a first end 68 of the collar 44 with an interference fit surface first end 70A, 70B, 70C, 70D, 70E, 70F, 70G, 70H and relief surface first end 71A, 71B, 71C, 71D, 71E, 71F, 71G 71H. Each rifled ridge 48A, 48B, 48C, 48D has two interference fit surfaces separated by a relief surface, in addition to a relief surface being located between each rifled ridge 48A, 48B, 48C, 48D. The interference fit surfaces of each rifled ridge 48A, 48B, 48C, 48D form a torsional interference fit between the collar 44 and the torque transfer tube 16. As shown rifled ridge 48A has interference fit surface first ends 70H, 70A that are separated by relief surface first end 71H. Rifled ridge 48B has interference fit surface first ends 70B, 70C that are separated by relief surface first end 71*b*, with relief surface first end 71A separating rifled ridge 48A, 48B. Rifled ridge 48C has interference fit surface first ends 70D, 70E that are separated by relief surface first end 71D, with relief surface first end 71C separating rifled ridge 48B, 48C. Rifled ridge 48D has interference fit surface first ends 70F, 70G that are separated by relief surface first end 71F, with relief surface first end 71E separating rifled ridge 48C, 48D and relief surface first end 71G separating rifled ridge 48D, 48A.

FIG. 9B shows an end view of a second end 72 of the collar 44 with an interference fit surface second end 74A, 74B, 74C, 74D, 74E, 74F, 74G, 74H and relief surface second end 73A, 73B, 73C, 73D, 73E, 73F, 73G, 73H. Each rifled ridge 48A, 48B, 48C, 48D has two interference fit surfaces separated by a relief surface, in addition to a relief surface being located between each rifled ridge 48A, 48B, 48C, 48D. The interference fit surfaces of each rifled ridge 48A, 48B, 48C, 48D form a torsional interference fit between the collar 44 and the torque transfer tube 16. As shown rifled ridge 48A has interference fit surface second ends 74H, 74A that are separated by relief surface second end 73H. Rifled ridge 48B has interference fit surface second ends 74B, 74C that are separated by relief surface second end 73B, with relief surface second end 74A separating rifled ridge 48A, 48B. Rifled ridge 48C has interference fit surface second ends 74D, 74E that are separated by relief surface second end 73D, with relief surface second end 73C separating rifled ridge 48B, 48C. Rifled ridge 48D has interference fit surface second ends 74F, 74G that are separated by relief surface second end 73F, with relief surface second end 73E separating rifled ridge 48C, 48D and relief surface second end 73G separating rifled ridge 48D, 48A.

A comparison of FIGS. 9A and 9B shows that the rifled ridges 48A, 48B, 48C, 48D, have a twist angle that is defined as the radial location of the interference fit surface first end 70A, 70, 70C, 70D, 70E, 70F, 70G. 70H of the rifled ridges 48A, 48B, 48C, 48D compared to the radial location of the respective interference fit surface second end 74A, 74B, 74C, 74D, 74E, 74F, 74G, 74H of the rifled ridges 48A, 48C, 48C, 48D in relation to the interference fit first end 70A, 70, 70C, 70D, 70E, 70F, 70G, 70H. In the present embodiment of the invention the twist angle is about 9.5 degrees, however, the twist angle can be less than or equal to 10 degrees, between 8 degrees and 10 degrees, or between 9 degrees and 10 degrees, depending on the need of a particular application. As shown in FIGS. 9A and 9B a comparison of the radial location of the first end 70A, 70B, 70C, 70D, 70E, 70F, 70G, 70H, shown in the end view of FIG. 9A, compared with the radial location of the second end 74A, 74B, 74C, 74D, 74E, 74F, 74G, 74H, shown in FIG. 9B; each second end 74A, 74B, 74C, 74D, 74E, 74F, 74G, 74H is slightly radially offset from each respective first end 70A, 70B, 70C, 70D, 70E, 70F, 70G, 70H shown in FIG. 9A. When the torque transfer tube 16 (shown in FIGS. 1 and 9A) is pushed through the collar 44, the torque transfer tube 16 will slightly twist because of the rifled ridges 48A, 48, 48C, 48D. This allows the torque transfer tube 16 to be connected to the collar without the use of set screws. It is within the scope of this invention for rifled ridges having the same twist geometry to be used with other components, such as the driven link 34.

Figure 6:
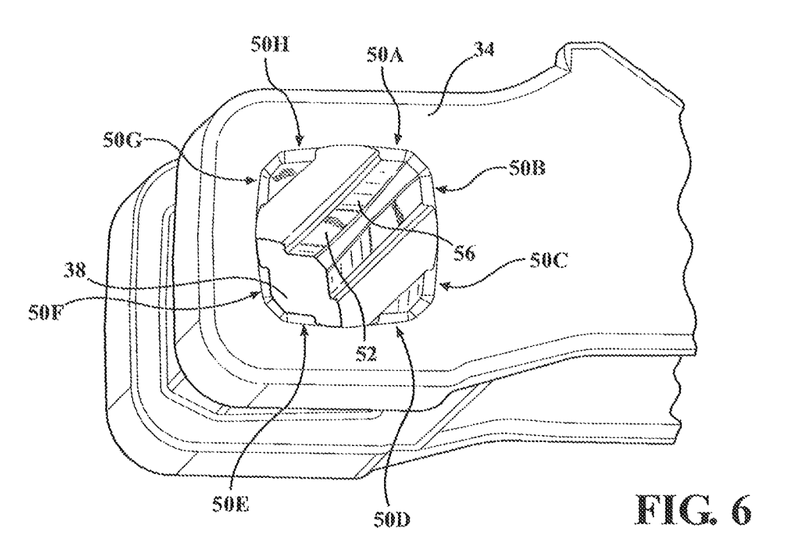
FIG. 6 is an enlarged bottom perspective view of a drive aperture formed through the driven link.
Figure 7:
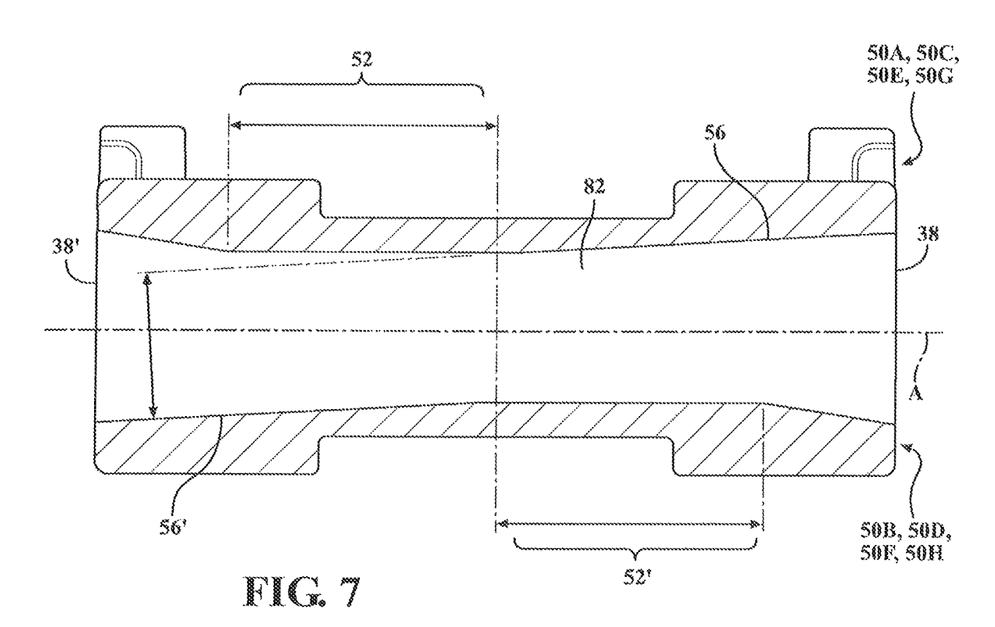
FIG. 7 is a cross sectional side plan view of the drive aperture of the driven link.
Figure 8:
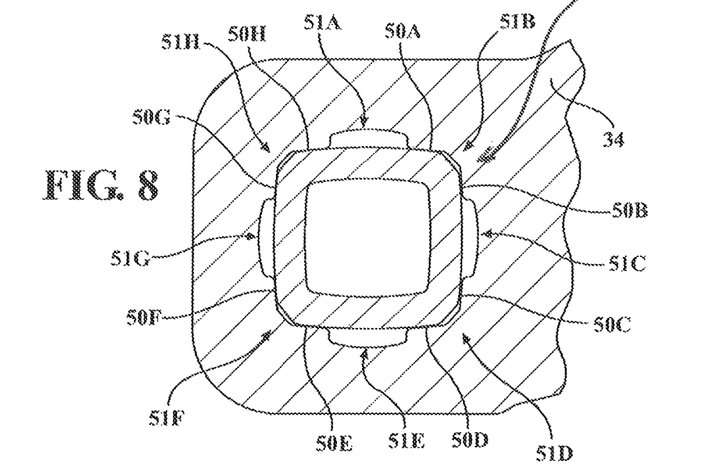
FIG. 8 is an enlarged side plan view of a drive aperture formed through the driven link.

Referring now to FIGS. 6-8 the details of the first drive aperture 38, second drive aperture 38' and drive bore 82 of the driven link are shown. The first drive aperture 38 and the second drive aperture 38' lead to the drive bore 82 that contains several drive zones 50A, 50B, 50C, 50D, 50E, 50F, 50G, 50H separated by drive relief zones 51A, 51B, 51C, 51D, 51E, 51F, 51G, 51H. The drive zones 50A, 50B, 50C, 50D, 50E, 50F, 50G, 50H provide a torsional non-sliding interference fit between the torque transfer tube 16 and the drive zones 50A, 50B, 50C, 50D, 50E, 50F, 50G, 50H of driven link 34. The drive relief zones 51B, 51D, 51F, 51H provide a neutral fit between the torque transfer tube and the drive relief zones 51A, 51B, 51C, 51D, 51E, 51F, 51G, 51H of the driven link 34. As shown in FIG. 8 drive relief zones 51A, 51C, 51E, 51G have no contact with the torque transfer tube 16 at all, which also serves to relieve torque.

FIG. 7 is a cross-sectional view of the drive bore 82 extending between the first drive aperture 38 and the second drive aperture 38'. The drive bore 82 has a longitudinal axis A. In FIG. 7 drive zones 50A, 50C, 50E, 50G each having a ramp surface 56 with a length that is an angled surface that extends from aperture 38 to a flat 52, which is a surface having a length with no angle. The ramp surface 56 and flat 52 of drive zones 50A, 50C are oriented in the same direction along the longitudinal axis A. Drive zones 50B, 50D, 50F, 50H have a ramp surface 56' that is an angled surface that extends from aperture 38' to a flat 52', which is a surface with no angle. The ramp surface 56' and flat 52' of drive zones 50B, 50D, 50F, 50H are oriented in the same direction along the longitudinal axis A, which is opposite the ramp surface 56 and flat 52 of drive zones 50A, 50C, 50E, 50G, which are also positioned at opposite sides of the drive bore 82 to creating the opposing draft when the torque transfer tube 16 is placed within the drive bore 82. These opposite ramp surfaces provide an opposing draft that holds and prevents the torque transfer tube 16 (show in FIG. 1) from sliding along longitudinally through the drive aperture 38, without a significant amount of force being applied to the torque transfer tube 16, as well as preventing the torque transfer tube 16 from rocking longitudinally in the drive bore 82.

The orientation of each drive zone 50A, 50B, 50C, 50D, 50E, 50F, 50G, 50H also provides an operational advantage. When the torque transfer tube 16 is rotated the transfer of torque between the torque transfer tube 16 and the driven link 34 will change through rotation since the location of each flat 54, 54' is different between each drive zone 50A, 50B, 50C, 50D, 50E, 50F, 50G, 50H. The result is that the drive aperture 38 and polygon facets of torque transfer tube 16 allow for tolerance compensation. Additionally the amount of force required to create a torsional non-sliding interference fit of the torque transfer tube 16 into the drive aperture 38 is about 2000 N or greater than 2000 N, thereby creating a significant torsional non-sliding interference fit retention between the driven link 34 and the torque transfer tube 16. Thus the connection of the torque transfer tube 16 with the drive aperture 38 is provided without the use of fasteners. The torsional non-sliding interference fit provides significant retention between the torque transfer tube 16 and the driven link 34, eliminating the need for fasteners including clips or retention rings between the torque transfer tube 16 and the driven link 34.

Referring to FIG. 2 another feature of the invention shown in the drawings include a self-aligning datum present between the various links, which ensure alignment between links and also prevents over deployment of the links. The self aligning datum includes a cradle surface 58 on the fixed link 18 that during assembly is configured to receive a rounded surface 60 of the coupler link 30. When the pin 26 is placed through the follower link 24, thereby connecting it to the fixed link 18 the rounded surface 60 being placed within the cradle surface 58 helps to align the follower link 24 with the follower link aperture 20. Also the use of the cradle surface 58 assists in alignment of the drive aperture 38 with the driven link aperture 22 for connection of the torque transfer tube 16. Additionally as shown in the drawings the four bar link 14, 14' includes a stop 62 extending upward from the driven link to contact a surface on the coupler 30. The stop 62 makes contact when the active aerodynamic application torque link system 10 is positioned in the deployed position. This helps to prevent over deployment of the system.

Figure 11:
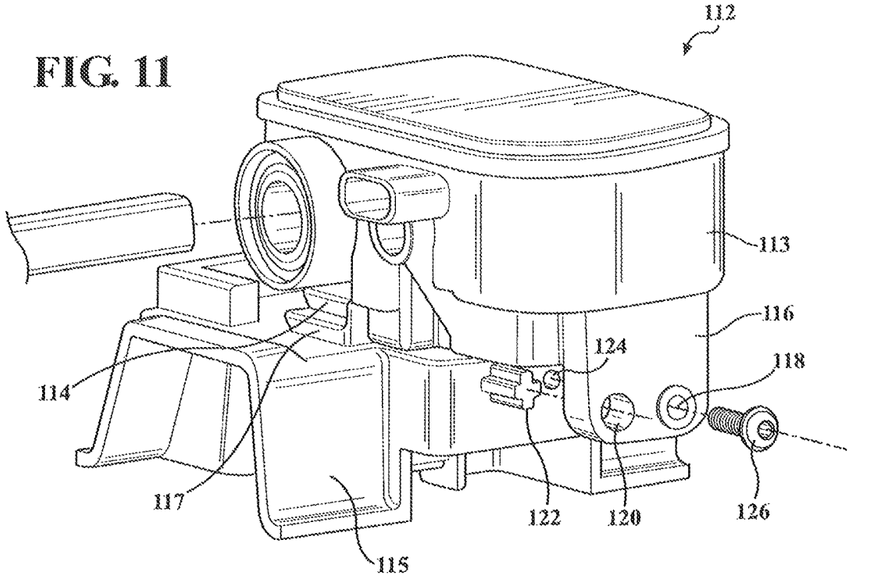
FIG. 11 is a side perspective view of the actuator according to an alternate embodiment of the invention.
Figure 12:
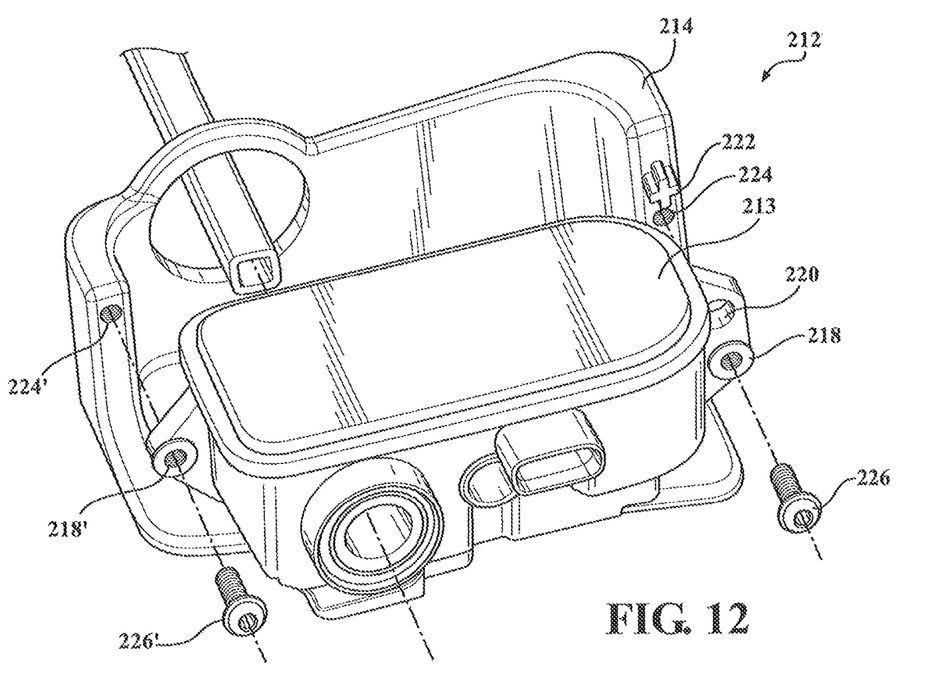
FIG. 12 is a side perspective view of the actuator according to another alternate embodiment of the invention.

Another feature of the invention includes different actuator housing configurations, shown in FIGS. 11 and 12, which connect the housing to the vehicle in a way that provides proper alignment of the components of the active aerodynamic torque link system 10, while also preventing the housing from rotating. FIG. 11 shows an actuator 112 what has a housing 113 that connects to a base 115 that is either a part of the vehicle or a piece that is connected with the vehicle. The base 115 includes a slot 117 that is configured to receive and hold a ledge 114 formed on a surface of the housing 113. The ledge 114 and slot 117 help to properly align and hold the housing 113 onto the base 115. The base 115 also has a dowel 112 projecting from a surface and a threaded aperture 124. The housing 113 also has an alignment tab 116 with an alignment aperture 120 and a fastener aperture 118. The alignment aperture 120 receives the dowel 122, which properly locates the housing 113 with respect to the base 115 so that a fastener 126 is properly inserted through the fastener aperture 118 and connects to the threaded aperture 124.

FIG. 12 depicts another alternate embodiment showing an actuator 212 with a housing 213 that connects to a base 214. The base 214 is either part of the vehicle or is a separate component that connects to the vehicle. The base 214 includes a dowel 222 projecting from a surface and threaded apertures 224, 224' at two opposing locations on the base 214. The housing 213 also an alignment aperture 220 and two fastener apertures 218, 218'. The alignment aperture 220 receives the dowel 222, which properly locates the housing 213 with respect to the base 214 so that fastener 226, 226' are properly inserted through a respective one of the fastener apertures 218, 218' and connects to the respective threaded apertures 224, 224'.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active aerodynamic application torque link system comprising:
   a four bar linkage having a fixed link with a follower link and driven link rotatably connected, a coupler rotatably connected to the follower link and the driven link;
   a torque transfer tube having a four sided polygon cross sectional shape;
   wherein the driven link has a drive bore with an opposing first drive aperture and a second drive aperture that receive the torque transfer tube, within the drive bore, the first drive aperture and the second drive aperture are a plurality of drive zones separated by one of a plurality of drive relief zones, wherein each one of the plurality of drive zones creates a torsional non-sliding interference fit between the torque transfer tube and the drive bore of the driven link and at least one of the plurality of drive relief zones creates a neutral fit between the torque transfer tube and the drive bore, wherein the plurality of drive zones and the plurality of drive relief zones reduce the spacing tolerances and eliminate lag between the driven link and the torque transfer tube, when the torque transfer tube rotates; and
   an actuator rotatably connected to the torque transfer tube for rotating the torque transfer tube thereby transferring torque to the four bar linkage through the driven link.

2. The active aerodynamic application torque link system of claim 1 wherein, each one of the plurality of drive zones include a ramp surface having a length, and a flat surface having a length for abutting against the torque transfer tube.

3. The active aerodynamic application torque link system of claim 1 further comprising:
   the plurality of drive zones each include a first one of the plurality of drive zones having a ramp surface with a length extending in the drive bore from the first drive aperture in a direction toward a second drive aperture and a flat surface having a length extending in the drive bore from the second drive aperture toward the first drive aperture, wherein the ramp surface of the first one of the plurality or drive zones contacts the flat surface of the first one of the plurality of drive zones in the drive bore;
   the plurality of drive zones each include a second one of the plurality of drive zones having a ramp surface with a length extending in the drive bore from the second drive aperture in a direction toward a first drive aperture and a flat surface having a length extending in the drive bore from a first drive aperture toward the second drive aperture, wherein the ramp surface of the second one of the plurality or drive zones contacts the flat surface of the second one of the plurality of drive zones in the drive bore, wherein the first one of the plurality of drive zones and the second one of the plurality of drive zones are aligned and positioned at opposite sides of the drive bore to create an opposing draft when the torque transfer tube is placed within the drive bore.

4. The active aerodynamic application torque link system of claim 1 wherein the connection of the torque transfer tube with the drive bore is provided without the use of fasteners.

5. The active aerodynamic application torque link system of claim 1 wherein the four sided polygon cross sectional shape of the torque transfer tube includes four radial facets, each having a rounded external surface with rounded corners between each of the four radial facets.

6. The active aerodynamic application torque link system of claim 1 further comprising at least one bushing connected to the torque transfer tube, wherein the at least one bushing has a neutral fit with the torque transfer tube and the at least one bushing is configured to rotate with the torque transfer tube within a driven link aperture formed in the fixed link.

7. The active aerodynamic application torque link system of claim 1 further comprising:

a cradle surface formed on the fixed link that is configured to receive a rounded surface formed on the coupler link that assists in aligning the four bar linkage during assembly;

a stop extending upward from the driven link, configured to contact a surface on the coupler when the active aerodynamic application torque link system is in a deployed position.

8. The aerodynamic application torque link system of claim 1 further comprising a collar connected to the actuator, the collar has a bore with and inside surface that receives and holds the torque transfer tube, wherein the inside surface has a plurality of rifled ridges extending through the inside surface of the bore where the plurality of rifled ridges each have a twist angle to create an torsional interference fit between the torque transfer tube and the collar.

9. The aerodynamic application torque link system of claim 8 wherein the twist angle is defined as the radial location of a first end of one of the plurality of rifled ridges compared to the radial location of a second end of one of said one of the plurality of rifled ridges in relation to the first end and the twist angle is about 9.5 degrees.

10. The aerodynamic application torque link system of claim 1 further comprising:
    a base connected to a vehicle;
    a slot in the base;
    a housing of the actuator connected to the base;
    a ledge formed on the housing, the ledge being sized to slidably engage the slot in the base;
    an alignment tab extending from the housing adjacent the base, wherein the alignment tab has a fastener aperture that is aligned with a threaded aperture on the base; and
    a fastener positioned through the fastener aperture of the alignment tab and connected to the threaded aperture of the base for securing the housing the base.

11. The aerodynamic application torque link system of claim 1 further comprising:
    a base connected to a vehicle;
    a housing of the actuator connected to the base;
    a dowel projecting from the housing;
    two threaded aperture formed on the housing at opposite longitudinal ends of the housing;
    an alignment aperture formed on the housing;
    two fastener apertures formed on the housing that each aligned with a respective one of the two threaded apertures when the dowel is inserted into the alignment aperture; and
    two fasteners each positioned through a respective one of the two fastener apertures of the housing and connected to a respective one of the two threaded apertures of the base for securing the housing the base.

12. An active aerodynamic application torque link system comprising:
    a four bar linkage having a fixed link with a follower link and a driven link rotatably connected, a coupler rotatably connected to the follower link and the driven link;
    a torque transfer tube having a four sided polygon cross sectional shape;
    wherein the driven link has a drive bore with an opposing first drive aperture and a second drive aperture with the torque transfer tube extending through the first drive aperture, drive bore and second drive aperture;
    an actuator rotatably connected to the torque transfer tube for rotating the torque transfer tube thereby transferring torque to the four bar linkage through the driven link; and a collar connected to the actuator, the collar has a bore with and inside surface that receives and holds the torque transfer tube, wherein the inside surface has a plurality of rifled ridges extending through the inside surface of the bore where the plurality of rifled ridges each have a twist angle to create an torsional interference fit between the torque transfer tube and the collar.

13. The active aerodynamic application torque link system of claim 12 wherein the connection of the torque transfer tube with the drive bore is provided without the use of fasteners.

14. The active aerodynamic application torque link system of claim 12 wherein the four sided polygon cross sectional shape of the torque transfer tube includes four radial facets, each having a rounded external surface with rounded corners between each of the four radial facets.

15. The active aerodynamic application torque link system of claim 12 further comprising at least one bushing connected to the torque transfer tube, wherein the at least one bushing has a neutral fit with the torque transfer tube and the at least one bushing is configured to rotate with the torque transfer tube within a driven link aperture formed in the fixed link.

16. The active aerodynamic application torque link system of claim 12 further comprising:
    a cradle surface formed on the fixed link that is configured to receive a rounded surface formed on the coupler link that assists in aligning the four bar linkage during assembly;
    a stop extending upward from the driven link, configured to contact a surface on the coupler when the active aerodynamic application torque link system is in a deployed position.

17. The aerodynamic application torque link system of claim 12 wherein the twist angle is defined as the radial location of a first end of one of the plurality of rifled ridges compared to the radial location of a second end of one of said one of the plurality of rifled ridges in relation to the first end and the twist angle is about 9.5 degrees.

18. The aerodynamic application torque link system of claim 12 further comprising:
    a base connected to a vehicle;
    a slot in the base;
    a housing of the actuator connected to the base;
    a ledge formed on the housing, the ledge being sized to slidably engage the slot in the base;
    an alignment tab extending from the housing adjacent the base, wherein the alignment tab has a fastener aperture that is aligned with a threaded aperture on the base; and
    a fastener positioned through the fastener aperture of the alignment tab and connected to the threaded aperture of the base for securing the housing the base.

19. The aerodynamic application torque link system of claim 12 further comprising:
    a base connected to a vehicle;
    a housing of the actuator connected to the base;
    a dowel projecting from the housing;
    two threaded aperture formed on the housing at opposite longitudinal ends of the housing;
    an alignment aperture formed on the housing;
    two fastener apertures formed on the housing that each aligned with a respective one of the two threaded apertures when the dowel is inserted into the alignment aperture; and
    two fasteners each positioned through a respective one of the two fastener apertures of the housing and connected to a respective one of the two threaded apertures of the base for securing the housing the base.

20. An active aerodynamic application torque link system comprising:

a four bar linkage having a fixed link with a follower link and driven link rotatably connected, a coupler rotatably connected to the follower link and the driven link;

a torque transfer tube having a four sided polygon cross sectional shape;

wherein the driven link has a drive bore with an opposing first drive aperture and a second drive aperture that receive the torque transfer tube, within the drive bore, the first drive aperture and the second drive aperture are a plurality of drive zones separated by one of a plurality of drive relief zones, wherein each one of the plurality of drive zones creates a torsional non-sliding interference fit between the torque transfer tube and the drive bore of the driven link and at least one of the plurality of drive relief zones creates a neutral fit between the torque transfer tube and the drive bore, wherein the plurality of drive zones and the plurality of drive relief zones reduce the spacing tolerances and eliminate lag between the driven link and the torque transfer tube, when the torque transfer tube rotates;

wherein the plurality of drive zones each include a first one of the plurality of drive zones having a ramp surface with a length extending in the drive bore from the first drive aperture in a direction toward a second drive aperture and a flat surface having a length extending in the drive bore from the second drive aperture toward the first drive aperture, wherein the ramp surface of the first one of the plurality or drive zones contacts the flat surface of the first one of the plurality of drive zones in the drive bore;

wherein the plurality of drive zones each include a second one of the plurality of drive zones having a ramp surface with a length extending in the drive bore from the second drive aperture in a direction toward a first drive aperture and a flat surface having a length extending in the drive bore from a first drive aperture toward the second drive aperture, wherein the ramp surface of the second one of the plurality or drive zones contacts the flat surface of the second one of the plurality of drive zones in the drive bore, wherein the first one of the plurality of drive zones and the second one of the plurality of drive zones are aligned and positioned at opposite sides of the drive bore to create an opposing draft when the torque transfer tube is placed within the drive bore; and an actuator rotatably connected to the torque transfer tube for rotating the torque transfer tube thereby transferring torque to the four bar linkage through the driven link.

21. The active aerodynamic application torque link system of claim 20 wherein the connection of the torque transfer tube with the drive bore is provided without the use of fasteners.

22. The active aerodynamic application torque link system of claim 20 wherein the four sided polygon cross sectional shape of the torque transfer tube includes four radial facets, each having a rounded external surface with rounded corners between each of the four radial facets.

23. The active aerodynamic application torque link system of claim 20 further comprising at least one bushing connected to the torque transfer tube, wherein the at least one bushing has a neutral fit with the torque transfer tube and the at least one bushing is configured to rotate with the torque transfer tube within a driven link aperture formed in the fixed link.

24. The active aerodynamic application torque link system of claim 20 further comprising:

a cradle surface formed on the fixed link that is configured to receive a rounded surface formed on the coupler link that assists in aligning the four bar linkage during assembly;

a stop extending upward from the driven link, configured to contact a surface on the coupler when the active aerodynamic application torque link system is in a deployed position.

25. The aerodynamic application torque link system of claim 20 further comprising:

a base connected to a vehicle;

a slot in the base;

a housing of the actuator connected to the base;

a ledge formed on the housing, the ledge being sized to slidably engage the slot in the base;

an alignment tab extending from the housing adjacent the base, wherein the alignment tab has a fastener aperture that is aligned with a threaded aperture on the base; and a fastener positioned through the fastener aperture of the alignment tab and connected to the threaded aperture of the base for securing the housing the base.

26. The aerodynamic application torque link system of claim 20 further comprising:

a base connected to a vehicle;

a housing of the actuator connected to the base;

a dowel projecting from the housing;

two threaded aperture formed on the housing at opposite longitudinal ends of the housing;

an alignment aperture formed on the housing;

two fastener apertures formed on the housing that each aligned with a respective one of the two threaded apertures when the dowel is inserted into the alignment aperture; and two fasteners each positioned through a respective one of the two fastener apertures of the housing and connected to a respective one of the two threaded apertures of the base for securing the housing the base.

* * * * *